US011247560B2

(12) United States Patent
Santos Junior et al.

(10) Patent No.: US 11,247,560 B2
(45) Date of Patent: Feb. 15, 2022

(54) METHOD FOR MONITORING AND CONTROLLING OPERATION OF THE REAR AXLE OF A VEHICLE

(71) Applicant: IVECO S.P.A., Turin (IT)

(72) Inventors: Edenilton Evangelista Santos Junior, Contagem (BR); Getúlio Soares Júnior, Sete Lagoas (BR); Paula Rolla Portela, Belo Horizonte (BR); Rafael Fortuna Pizzi, Sete Lagoas (BR)

(73) Assignee: IVECO S.P.A., Turin (IT)

( * ) Notice: Subject to any disclaimer, the term of this patent is extended or adjusted under 35 U.S.C. 154(b) by 47 days.

(21) Appl. No.: 16/767,981

(22) PCT Filed: Nov. 23, 2018

(86) PCT No.: PCT/BR2018/050436
§ 371 (c)(1),
(2) Date: May 28, 2020

(87) PCT Pub. No.: WO2019/104404
PCT Pub. Date: Jun. 6, 2019

(65) Prior Publication Data
US 2021/0188086 A1    Jun. 24, 2021

(30) Foreign Application Priority Data
Nov. 28, 2017   (BR) .......................... 102017025512-3

(51) Int. Cl.
*B60K 23/08*   (2006.01)
*B60K 17/22*   (2006.01)
(Continued)

(52) U.S. Cl.
CPC .............. *B60K 23/08* (2013.01); *B60K 17/22* (2013.01); *B60K 17/348* (2013.01); *B60K 17/36* (2013.01);
(Continued)

(58) Field of Classification Search
CPC ...... B60K 23/08; B60K 17/22; B60K 17/348; B60K 17/36; B60K 23/04; B60K 2023/046; B60K 17/00; B60K 23/00
See application file for complete search history.

(56) References Cited

U.S. PATENT DOCUMENTS

| 5,711,389 A | 1/1998 | Schlosser |
| 9,020,715 B2 | 4/2015 | Nellums et al. |
(Continued)

FOREIGN PATENT DOCUMENTS

| DE | 102006060842 A1 * | 6/2008 | ............. B60K 23/08 |
| GB | 2066182 A | 7/1981 | |
(Continued)

OTHER PUBLICATIONS

International Search Report and Written Opinion for Application No. PCT/BR2018/050436 dated Oct. 30, 2019 (16 pages).

*Primary Examiner* — Justin Holmes
(74) *Attorney, Agent, or Firm* — Leason Ellis LLP

(57) ABSTRACT

A method for controlling the safe operation of a rear axle of a set of combined axles powered by a motor vehicle, particularly for a vehicle designed to carry loads and which have 6×4, 8×4 or 10×4 type traction configurations, or tridem models formed by three drive axles. The method includes a set of steps and activities that ensure proper and safe operation of systems and mechanisms for uncoupling and raising a rear axle of a vehicle, and more specifically checking a status of certain operating parameters of the rear axle and of the vehicle itself in order to permit or prevent uncoupling and coupling, as well as raising and lowering of the rear axle of the vehicle.

10 Claims, 4 Drawing Sheets

(51) Int. Cl.
*B60K 17/348* (2006.01)
*B60K 17/36* (2006.01)
*B60K 23/04* (2006.01)

(52) U.S. Cl.
CPC ........ *B60K 23/04* (2013.01); *B60K 2023/046* (2013.01)

(56) References Cited

U.S. PATENT DOCUMENTS

| | | | | |
|---|---|---|---|---|
| 9,784,355 | B1* | 10/2017 | Brammer | B60K 17/165 |
| 2009/0166106 | A1* | 7/2009 | Batdorf | B60K 6/52 |
| | | | | 180/24.06 |
| 2015/0072826 | A1* | 3/2015 | Dubey | F16H 48/05 |
| | | | | 475/221 |
| 2018/0051786 | A1* | 2/2018 | Krishnan | B60K 17/3462 |
| 2018/0222317 | A1 | 8/2018 | De Lemos et al. | |

FOREIGN PATENT DOCUMENTS

| | | |
|---|---|---|
| GB | 2514910 A | 12/2014 |
| GB | 2530877 A | 4/2016 |
| WO | 2008077603 A1 | 7/2008 |
| WO | 2014088566 A1 | 6/2014 |
| WO | 2016105254 A1 | 6/2016 |

\* cited by examiner

METHOD FOR MONITORING AND CONTROLLING OPERATION OF THE REAR AXLE OF A VEHICLE

FIELD OF THE INVENTION

The present invention generally refers to a method for controlling the safe operation of the rear axle of a set of combined axles driven by motor vehicles, such as road transport vehicles with 6×4, 8×4 or 10×4 type traction configurations, or tridem models formed by three drive axles.

BACKGROUND OF THE INVENTION

It is the general knowledge of those skilled in the art that motor vehicles and, more particularly, vehicles intended for road transport of freight, such as trucks, are usually driven through the rear axle assembly, which is connected by the so-called cardan axle to the drive axle formed primarily by the engine and gear. Said cardan axle is usually the connection between the output of the power assembly and the axle differential that transmits power to the wheels.

For road freight vehicles that have two rear axles, vehicles can take on a 6×2, 6×4, 8×4, 10×4, or even a 6×6 and 8×8 configuration, as is the case with "off road", that is, a total number of contact points, two, four, six or even eight contact points have traction to provide vehicle movement. Particularly, in the case of tractor trucks, they usually have two rear axles, and can take on the 6×2 or 6×4 traction configuration, in which of the vehicle's six wheels, only two or four are driven, usually the two wheels of the first rear axle, or the four wheels of the two rear axles are driven.

As those skilled in the art will appreciate, the use of at least two drive axles, as in the 6×4 configuration, is quite desirable for legislation, because there are countries, including Brazil, that restrict the movement of vehicles according to their load capacity and, for example, to carry a greater load limit the vehicle necessarily needs to rely on a 6×4 traction configuration. In addition, for application reasons, it is also desirable for vehicles to have a higher traction number, as with vehicles for off-road use, for example in sugarcane plantations or mining.

However, when the vehicle is not loaded in order to obtain savings on fuel and tires, it is desirable that one of the axles is not used. If the traction configuration is, for example, of the type 6×2, one of the rear axles, the one not driven, may be suspended and, accordingly, fuel consumption may be reduced, as well as tire wear. This is possible according to a technical solution well known in the state of the art, in which an air bag is usually used to suspend the axle, thus taking advantage of the compressed air line existing in these types of vehicles.

However, this type of solution is limited to the 6×2 traction configuration and cannot be used in vehicles with 6×4 or 8×4 traction configuration, for example, since no driven axle can be suspended as the power would be lost to the suspended axle. Therefore, for these reasons, many companies seek solutions that allow the coupling and uncoupling of the traction of at least one axle of a vehicle, particularly a cargo vehicle, such as trucks and tractor trucks.

In this context, it is known that the state of the art contains some solutions whereby automatic or manual drive selection of one or more axles is permitted. An already known solution consists of engaging or decoupling the gear of the central differential sending power to the axle. This solution, however, cannot be applied to the 6×4 or 8×4 traction configurations, since no central differential is usually used, but traction is transmitted from one differential to another sequentially via the cardan axle.

One solution that proved to be quite practical and functional is disclosed in patent application BR10 2015 018592-8, priority of the international patent application PCT/BR2016/050182, which are incorporated herein by reference and generally relates to a transmission axle of a motor vehicle that allows for its engagement and disengagement to enable the selection of traction of the vehicle and thus, enabling lifting of the decoupled axle to quickly and conveniently transform a vehicle with traction configuration, for example, 6×4 or 8×4, in a 6×2 or 8×2 traction configuration. As a result, the same road freight vehicle can work in different conditions according to the location and cargo transported.

Thus, although the solution proposed in the state of the art is highly functional, there was still a need to provide a control method that ensures the proper activation of systems and mechanisms for coupling and raising axles, but mainly the safety of the vehicle, the driver and the highways. The present invention seeks to overcome this limitation of the state of the art.

DESCRIPTION OF THE INVENTION

Given the scenario presented above, it is one of the objectives of this invention to provide a method for controlling the operation of the rear axle of a set of combined drive axles, particularly road freight vehicles with at least two drive axles, such as, for example, in the 6×4 and 8×4 traction configurations.

More particularly, it is one of the objectives of this invention to provide a method for properly and effectively controlling the actuation of the systems and mechanisms for coupling traction and raising the rear axle of the combined drive axle set from a road cargo transport vehicle.

Thus, in order to achieve the objectives and technical and functional effects mentioned above, as well as other advantages, the invention in question refers to a method for monitoring and controlling the operation of a rear axle of a vehicle, particularly those used for freight transport, being initially comprised by the activation of an actuation button that is usually inside the cab of said vehicle, based on which it has the following execution steps:

a) check that the rear axle is locked:
a1) if so, keep it locked;
a2) if not, wait for the vehicle status to be checked:
b) check the status of the vehicle—whether it is connected:
b1) if not, it does not release the rear axle lifting;
b2) if so, check the status of the vehicle—whether it is stationary:
b3) if not, return to step (b1),
b4) if so, check the status of the vehicle—whether it is unloaded:
b5) if not, return to step (b1),
b6) if so, check the status of the vehicle—whether it has sufficient air in the pneumatic system:
b7) if not, return to step (b1)
b8) if so, check that the vehicle is loaded with the capacity below the tread limit with all axles driven from the axle set:
b9) if not, it does not release wheel end traction
b10) if so, emit electrical signals to solenoid valves, respectively:

to feed with pneumatic air the mechanism of release of the cardan axle;

to feed with pneumatic air the raising/lifting mechanism of the rear axle.

According to an embodiment of the present invention, during the step (b8) to check the weight of the vehicle with load, the tread limit with all the axles driven from the axle set should be 43 tons. Logically, such a limit may vary according to the laws of the country in which the vehicle travels. In this context, particularly according to the embodiment of the present invention, step (b8) analyzes whether the vehicle is loaded with up to 43 tons.

According to another embodiment of the present invention, during said step (b10), it is possible to predict that electrical signals are emitted to solenoid valves to promote pneumatic air supply into the release mechanism of the wheel ends, and/or to the solenoid valves to provide pneumatic air supply of a release mechanism of the rear axle locking system, which is, according to one of the possible embodiments, arranged in the differential of the first rear axle of the vehicle's assembly axles.

Additionally, according to another embodiment of the present invention, and more particularly to a complementary embodiment, the method comprises the deactivation of said activation button and, from that moment on, the following steps are carried out:

(b) check the status of the vehicle—whether it is connected:

b1) if not, it does not release the lowering of the rear axle;
b2) if so, check the status of the vehicle—whether it is stationary:
b3) if not, return to step (b1),
b10) if so, emit electrical signals to solenoid valves to release pneumatic air from the raising/lifting mechanism of the rear axle;

c) wait for a predetermined period of time Δt and send new electrical signals to the solenoid valves to release pneumatic air from the cardan axle release mechanism.

Optionally, according to another embodiment of the present invention, in step (b10), the electrical signals can be sent to solenoid valves so as to release the pneumatic air from the end release mechanism of the wheels.

Further, according to another embodiment of the method of the present invention, during step (c), and more particularly, after waiting for the predetermined time period Δt, the electrical signals are sent to the solenoid valves in order to release the pneumatic air from the release mechanism of the rear axle locking system.

According to possible embodiments of the present invention, the predetermined time period Δt, established in step (c), is of the order of 15-45 seconds, and more particularly, 30 seconds.

SUMMARY DESCRIPTION OF DRAWINGS

The characteristics, advantages and technical effects of the present invention, as indicated above, will be more appropriately understood by a person skilled in the art from the following detailed description, provided for illustration only, and non-restrictively, of preferred embodiments of the invention, which are based on the accompanying schematic drawings, wherein.

DESCRIPTION OF EMBODIMENTS OF THE INVENTION

Figure 1:
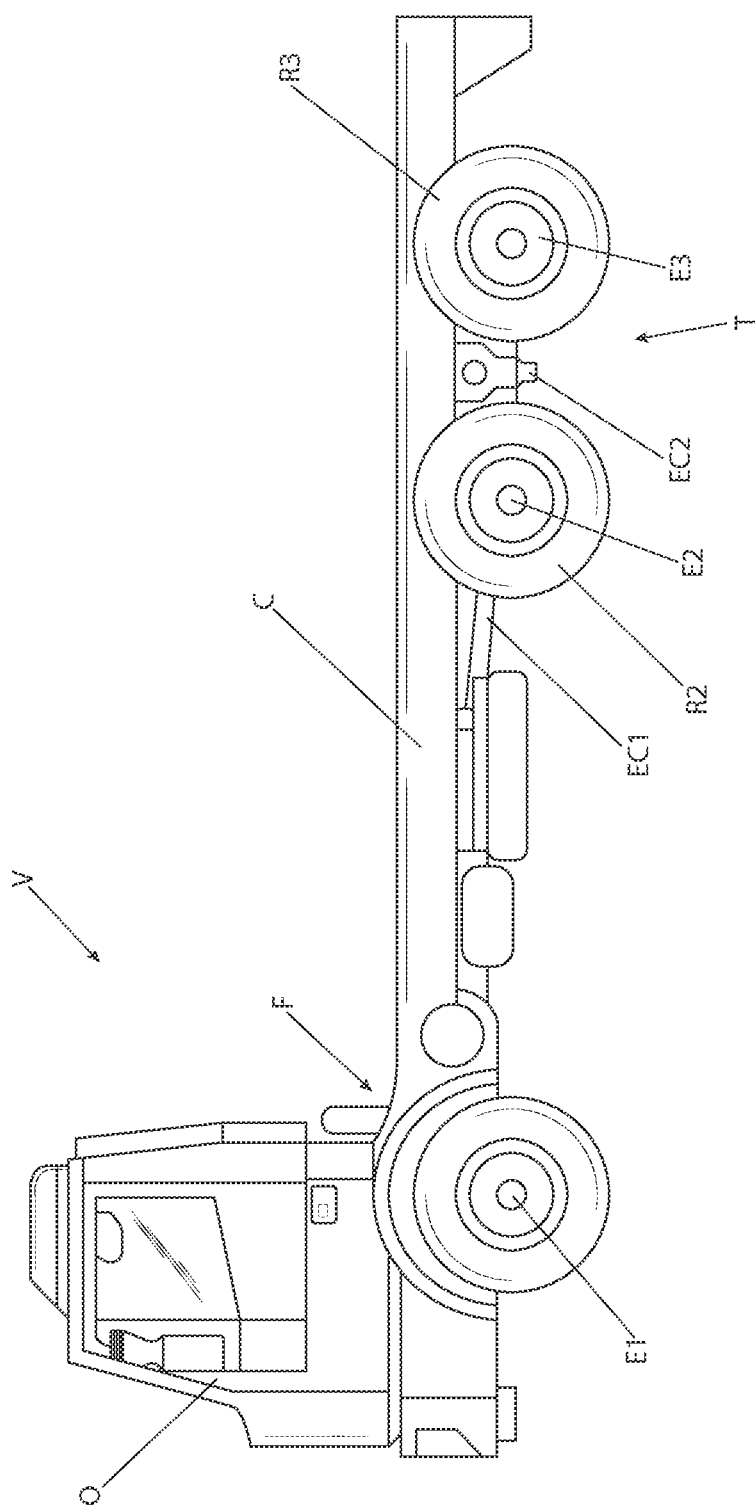
FIG. 1 is a schematic side view of a cargo transportation vehicle, such as a truck, which has a 6×4 traction configuration, for example with a set of combined axle assembly of the tandem type.
Figure 2:
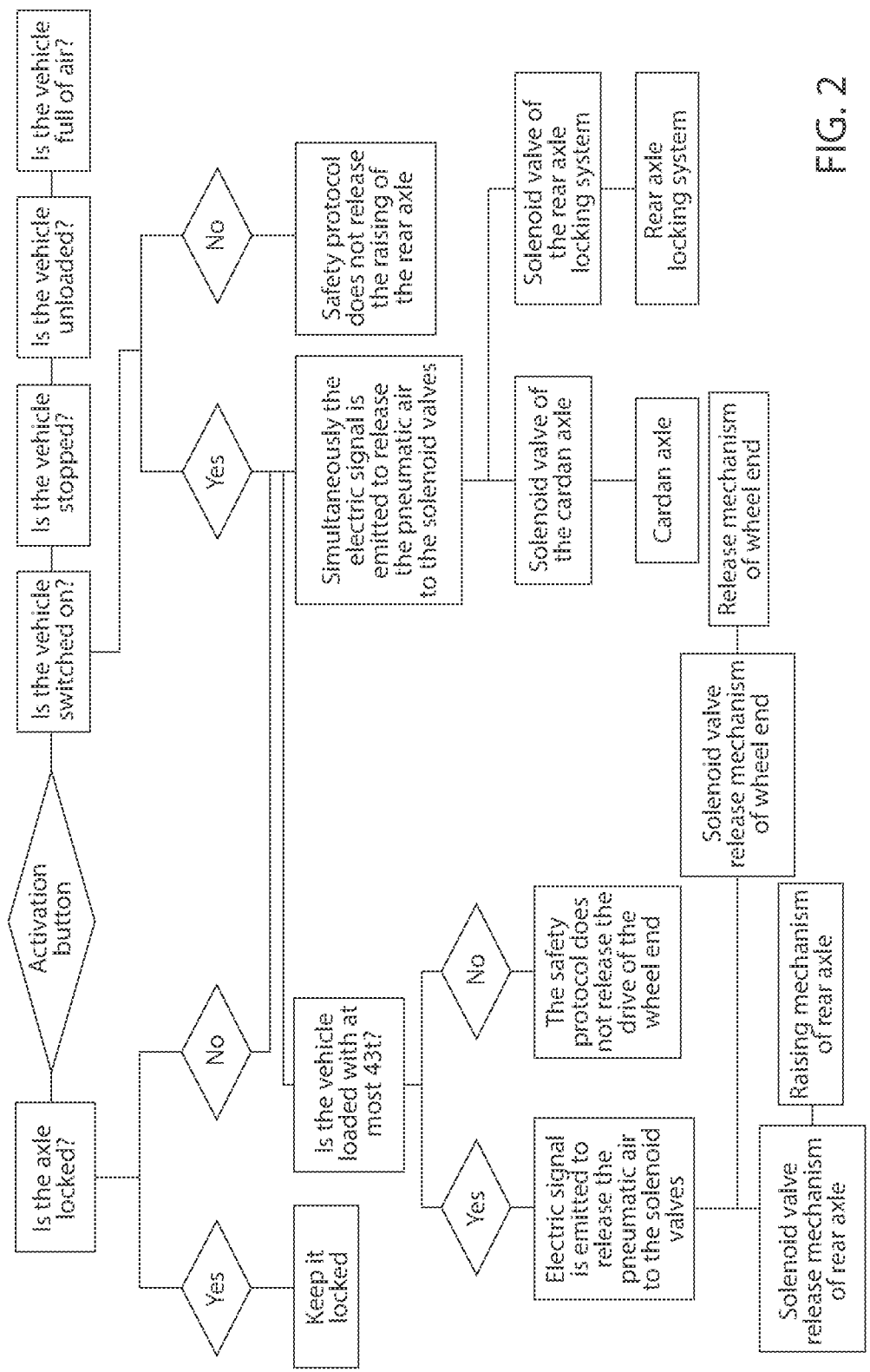
FIG. 2 shows a schematic flowchart of the method for controlling the operation of the rear axle of a motor vehicle, according to the present invention, in activation condition.
Figure 3:
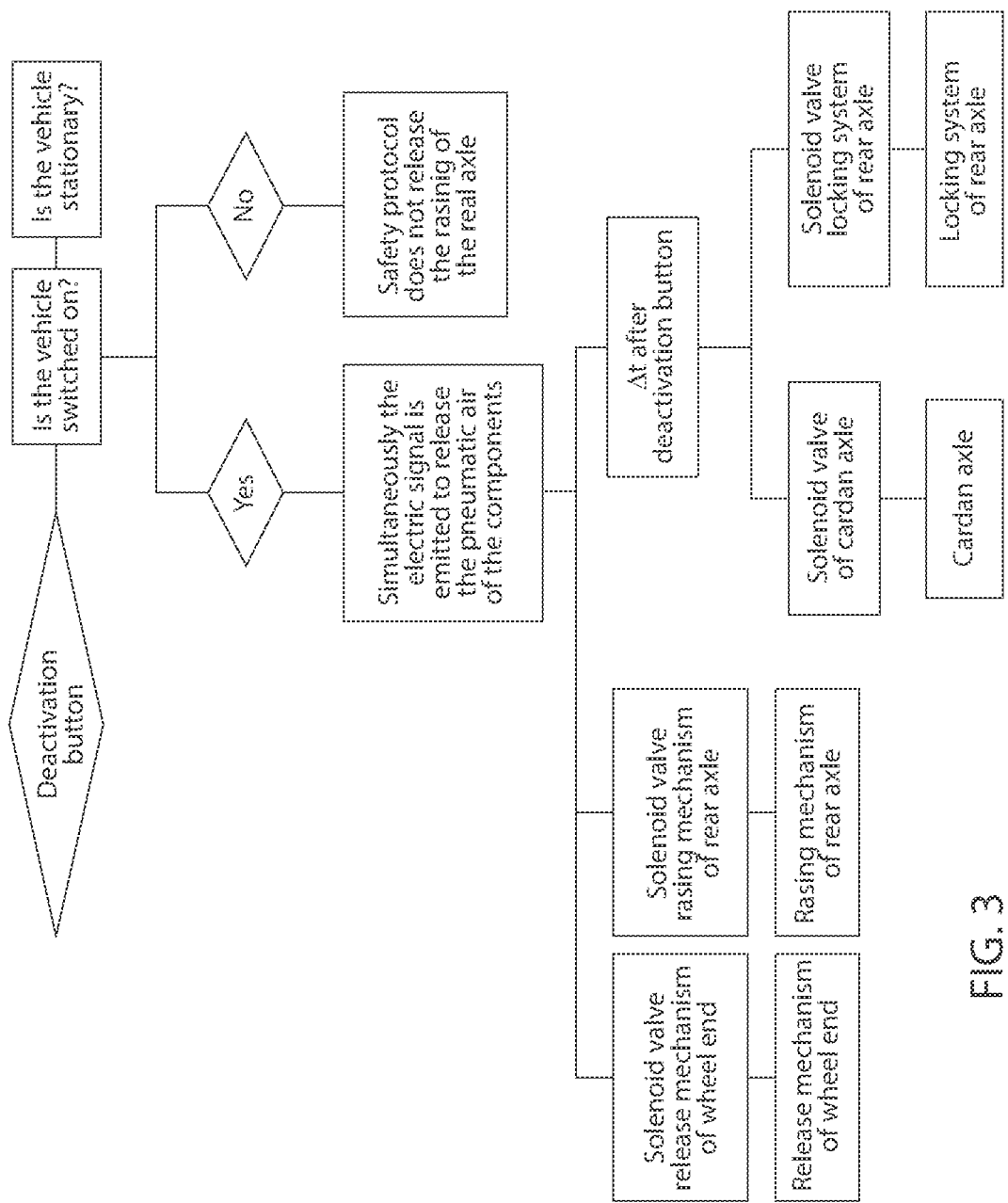
FIG. 3 shows another schematic flowchart of the method for controlling the operation of the rear axle of a motor vehicle, according to the present invention, in deactivation condition.

Initially, for the purpose of illustration and improved understanding of the present invention, as will be appreciated by those skilled in the art, FIG. 1 schematically represents a road vehicle for transporting cargo or goods, such as a truck (V) comprising a tandem axle assembly (T) with a 6×4 type traction configuration.

Thus, as indicated in FIG. 1, the truck (V) comprises a cab (O) for the operator/conductor and under which a power train (F) transmission set is provided, such as a combustion engine associated with the gearbox, which are mounted on the chassis (C) which also supports a front axle (E1) and the set of tandem (T) traction axles formed by a first rear axle (E2) and a second rear axle (E3). A first cardan axle (EC1) extends from the gearbox to a first differential of the first rear axle (E2) and, from the differential of the first rear axle (E2), a second cardan axle (EC2) extends to the differential of the second rear axle (E3). Thus, the power is generally divided equally from the first and second differentials to the wheels (R2, R3) of the first and second rear axles (E2, E3). Furthermore, it is known that differentials transmit the power to the wheels of each axis in a usual way using a crown/pinion system and epicycloidal gears in a manner well known to those skilled in the art. Other details of the vehicle (V) are represented in a schematic way and dispense with further explanations, since they are well known in cargo transport vehicles known in the state of the art.

As indicated above, it is desirable for certain applications, such as vehicles without loads, that no power be transmitted from the differential of the first rear axle (E2) to the differential of the second rear axle (E3), causing the vehicle to assume a 6×2 traction configuration. With this 6×2 traction configuration, it is possible that the third axle (E3)—or second rear axle is raised in order to save fuel and tires. The form of raising of the second rear axle (E3) can be done by the usual known means, such as taking advantage of the pneumatic systems commonly present in vehicles for cargo transport, such as trucks (V). This type of decoupling of the traction of the second rear axle can be obtained through systems and mechanisms as defined in patent document BR10 2015 018592-8, priority of the international patent application PCT/BR2016/050182, which are incorporated herein by reference.

Additionally, also prominently incorporated into the present by reference, patent applications BR 10 2016 029390-1, BR 10 2016 029395-2 and BR 10 2016 029398-7, which refer to systems and mechanisms capable of selectively promoting the uncoupling of one of the drive axles, as well as the uncoupling of the wheels individually through, among a series of possible means, the pneumatic system of trucks (V).

The aim of the present invention is precisely to monitor and safely control the operation of that rear axle and, more specifically, to disclose a method capable of controlling mechanisms and systems for coupling and uncoupling of axles and wheels, as well as the systems and mechanisms for listing the uncoupled axle. According to an embodiment of the present invention, said method is intended for controlling the operation of the second rear axle (E3), in order to transform the 6×4 traction configuration to a 6×2 traction configuration, along with the raising of the uncoupled axle to obtain the economic benefits with fuel consumption and tire wear.

Naturally, the present detailed description of an embodiment of the invention is referred to as a 6×4 and 6×2 traction configuration, but of course the invention can be employed in any traction configuration which is desirable to activate or disable a traction axle, such as a traction configuration of 4×4/4×2 or 8×4/8×2, etc.

Given the scenario summarized above, and as represented in the accompanying drawings, it can be said that the method for monitoring and controlling the operation of the rear axle of a set of combined drive axles, according to the present invention, begins with the operator/driver of the vehicle (V) by activating the actuation button which, according to an embodiment, is arranged inside the cab (O) of the vehicle (V). From this moment onwards, the method for controlling the operation of the vehicle axle basically comprises the following steps:

a) check that the rear axle is locked:
a1) if so, keep it locked;
a2) if not, wait for the vehicle status to be checked (V):
b) check the status of the vehicle—whether it is connected:
b1) if not, it does not release the rear axle lifting;
b2) if so, check the status of the vehicle—whether it is stationary:
b3) if not, return to step (b1),
b4) if so, check the status of the vehicle—whether it is discharged:
b5) if not, return to step (b1),
b6) if so, check the status of the vehicle—whether it has sufficient air in the pneumatic system:
b7) If not, return to step (b1)
b8) if so, check that the vehicle is loaded with the capacity below the tread limit with all axles driven from the axle set:
b9) if not, it does not release wheel end traction
b10) if so, issue electrical signals to solenoid valves, respectively:
to feed with pneumatic air the mechanism of release of the cardan axle;
to feed with pneumatic air the raising/lifting mechanism of the rear axle.

Additionally, according to an optional embodiment of the present invention, the method for controlling the operation of the vehicle axle (V) is intended for trucks for cargo transport and whose tread limit with all its axles driven from the axle set is 43 tons, therefore, in said step (b8), the method checks whether the vehicle is loaded with up to 43 tons. If it is detected that it is not within the limit, return to step (b1), in which the raising of the axle is blocked.

Also, according to said step (b10), according to another alternative embodiment of the present invention, the method for controlling the operation of the vehicle axle (V) can emit electrical signals for the solenoid valves that supply pneumatic air to the wheel end release mechanism. In this case, the vehicle (V) is equipped with a wheel release system, as defined by patent documents BR 10 2016 029395-2 and BR 10 2016 029398-7, cited merely by reference.

Optionally, further with respect to said step (b10) of the method for controlling the operation of the vehicle axle (V), it is possible that another electrical signal will be emitted for the solenoid valves feeding the release mechanism of the rear axle locking system, more specifically, the mechanism disposed in the differential of the first rear axle (E2), whose construction can be seen according to the teachings disclosed in patent document BR 10 2016 029390-1, incorporated herein by reference.

According to an embodiment of the present invention, the present method for controlling the operation of the vehicle axle (V) is applied to the second rear axle (E3), and thus allowing the same vehicle to be able to work on a 6×4 or 6×2 traction configuration, providing greater flexibility to the driver/operator who can thus tow different types, models and carrying capacity.

Continuing the method for monitoring and controlling the operation of the rear axle of the combined axle drive set, according to the present invention, when the driver/operator of the vehicle (V) wishes to disable the coupling and uncoupling systems and mechanisms of the axles and wheels, as well as the lifting systems and mechanisms of the uncoupled axle, it is necessary to disable the actuation button that is usually inside the cab (0) of the vehicle (V) and, from this point onwards, the method for controlling the operation of the vehicle axle basically comprises the following steps:

b) check the status of the vehicle—whether it is connected:
b1) if not, it does not release the lowering of the rear axle;
b2) if so, check the status of the vehicle—whether it is stationary:
b3) if not, return to step (b1),
b10) if so, emit electrical signals to solenoid valves to release pneumatic air from the raising/lifting mechanism of the rear axle;
c) wait for a predetermined period of time Δt and send new electrical signals to solenoid valves to release pneumatic air from the cardan axle release mechanism.

Just as in the mode of activation of the actuation button, in the mode of deactivation of said button during the step (b10), according to an alternative embodiment of the present invention, the method for controlling the operation of the vehicle axle (V) can emit electrical signals to the solenoid valves responsible for the discharge of pneumatic air from the release mechanism of the wheel ends. In this case, the vehicle (V) is equipped with the wheel release system, as defined by patent documents BR 10 2016 029395-2 and BR 10 2016 029398-7, cited by reference.

Also, according to another optional embodiment of the present invention, in the mode of deactivation of the actuation button and, specifically in step (c), after waiting for the predetermined time period Δt, it emits other electrical signals to the solenoid valves responsible for the discharge of pneumatic air from the release mechanism of the rear axle locking system, more particularly the mechanism arranged on the differential of the first rear axle (E2), the construction of which can be observed according to the teachings disclosed in patent document BR 10 2016 029390-1, incorporated herein by reference.

According to an embodiment of the present invention, the predetermined time period Δt, established in step (c), is of the order of 15-45 seconds, and more particularly, about 30 seconds.

Thus, at the end, after completing the steps mentioned above, said vehicle (V) returns to its original traction configuration, such as 6×4, where said second rear axle (E3) is positioned in such a way as to place its wheels in contact with the ground, and the traction mechanisms are properly connected to transfer power to said axle.

Figure 4:
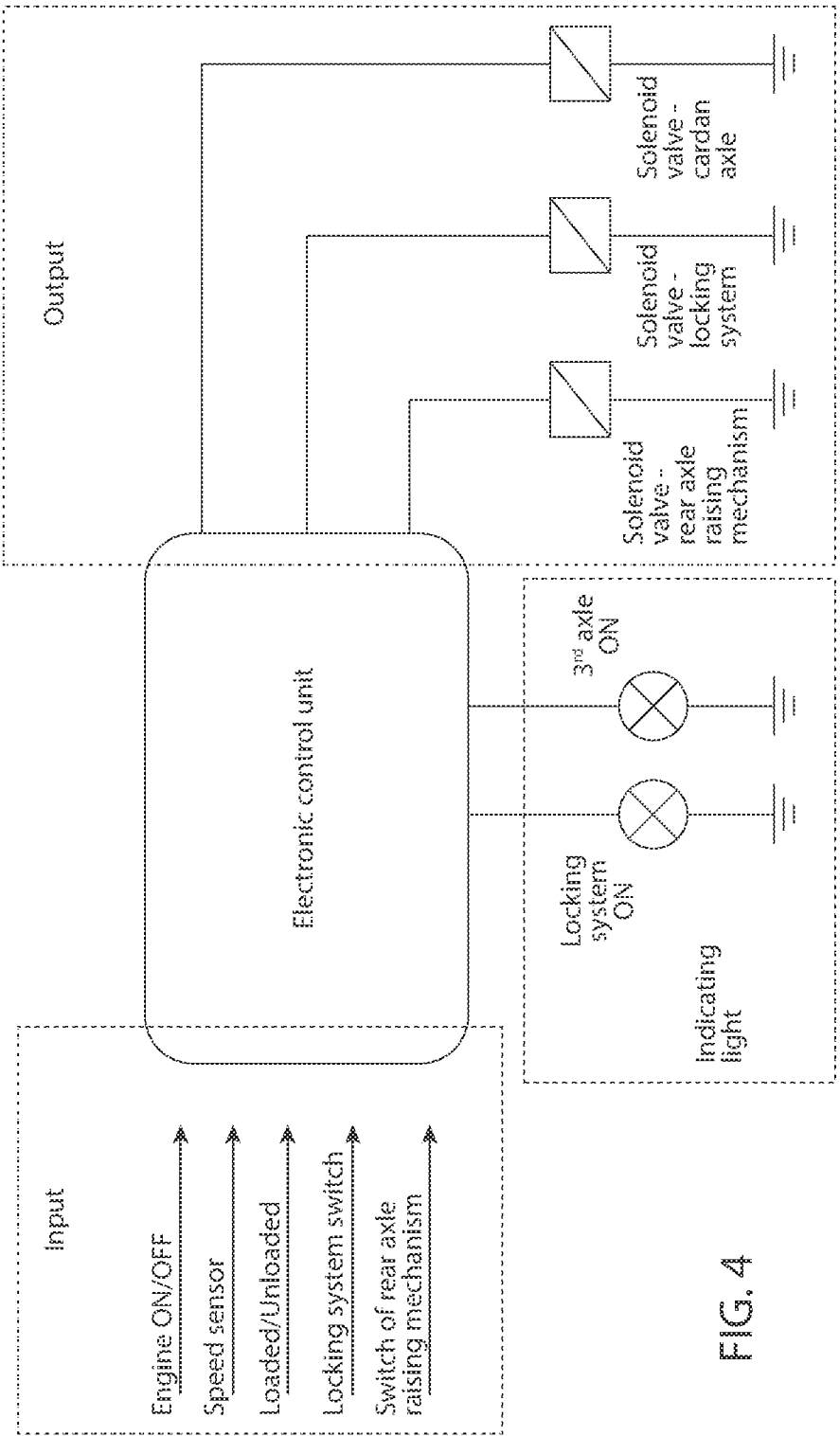
FIG. 4 shows a schematic block diagram of the actuator components responsible for the method for controlling the operation of the rear axle of the motor vehicle, according to the present invention.

By way of illustration only, FIG. 4 shows a schematic representation through a block diagram, in which the main parameters that are monitored and controlled are identified by the present method for monitoring and controlling the rear axle operation of the combined set of drive axles of a vehicle. More particularly, on the one hand it is possible to verify the input parameters, which are engine operating signals, speed sensors, load sensors, indicators of the locking systems, as well as signals from the axle raising/lifting system and mechanism. On the other hand, the output signals responsible for activating the solenoid valves controlling the feeding and release of pneumatic air from the systems and mechanisms of wheel release and lock, and cardan axle release are checked.

In addition, as a way of interacting with the operator/driver of the vehicle (V), it is possible to have indicators on the functional state of the vehicle, according to the monitoring method conducted by this method of monitoring and controlling the operation of the rear axle of the vehicle, for example, light indicators such as lamps and signs, or even a computer interface capable of displaying graphic representations, etc.

Thus, in view of the above, it is possible to note that the method for monitoring and controlling the operation of the rear axle of a cargo transport vehicle with combined drive axles, according to the present invention, is capable of ensuring the proper functioning of the mechanisms and systems for locking and raising/lifting the axle and, more specifically, effectively control the safe conditions to allow the decoupling and raising of the axle only after identifying certain operating parameters which do not endanger the operator/driver and third parties.

Finally, considering the above, it is important to clarify that the purpose of this description is solely to present and define illustrations of preferred embodiments of the method for monitoring and controlling the real axle operation of a vehicle for cargo transport. Accordingly, as those skilled in the art will appreciate, various modifications and constructive and executive combinations of equivalent elements and steps are possible without straying from the scope of protection defined by the accompanying claims.

The invention claimed is:

1. A method for monitoring and controlling an operation of a rear axle of a vehicle, the method comprising steps of:
   a) checking, by an electronic control unit, that the rear axle is locked;
      a1) if the rear axle is locked, keeping the rear axle locked;
      a2) if the rear axle is not locked, waiting for a status of the vehicle to be checked;
   b) checking, by the electronic control unit, the status of the vehicle, the status being whether the vehicle is switched on: b 1) if the vehicle is not switched on, not raising the rear axle;
      b2) if the vehicle is switched on, checking whether the vehicle is stationary;
      b3) if the vehicle is not stationary, returning to the step (b 1);
      b4) if the vehicle is stationary, checking whether the vehicle is unloaded;
      b5) if the vehicle is not unloaded, returning to the step (b 1);
      b6) if the vehicle is unloaded, checking whether the vehicle has sufficient air in a pneumatic system;
      b7) if the vehicle does not have sufficient air in the pneumatic system, returning to the step (b 1)
      b8) if the vehicle does have sufficient air in the pneumatic system, checking that the vehicle is loaded with a capacity below a tread limit with all axles driven from an axle set:
      b9) if the vehicle is not loaded with the capacity below the tread limit with all axles driven from the axle set, not releasing wheel end traction; and
      b10) if the vehicle is loaded with the capacity below the tread limit with all axles driven from the axle, sending electrical signals to solenoid valves, respectively:
         to feed with pneumatic air a mechanism of release of a cardan axle;
         to feed with pneumatic air a raising/lifting mechanism of the rear axle.

2. The method, according to claim 1, wherein the vehicle capacity within the tread limit with all its axles driven from the axle set is 43 tons.

3. The method, according to claim 1, wherein the capacity is 43 tons.

4. The method, according to claim 1, wherein the step (b10) comprises sending electrical signals to solenoid valves to power with pneumatic air a wheel end release mechanism.

5. The method, according to claim 1, wherein the step (b 1 0) comprises sending electrical signals to solenoid valves to power with pneumatic air a mechanism for releasing a locking system for the rear axle.

6. The method, according to claim 5, wherein the mechanism for releasing the locking system for the rear axle is arranged in a differential of a first rear axle.

7. The method, according to claim 1, further comprising a step of deactivating comprising steps of:
   c) checking, by the electronic control unit, the status of the vehicle to determine whether it is switched on;
      c1) if the vehicle is not switched on, not lowering the rear axle;
      c2) if the vehicle is switched on, checking whether the vehicle is stationary;
      c3) if the vehicle is not stationary, returning to step (c1);
      c4) if the vehicle is stationary, sending electrical signals to solenoid valves to release pneumatic air from the raising/lifting mechanism of the rear axle;
   d) waiting for a predetermined period of time; and
   e) sending new electrical signals to solenoid valves to release pneumatic air from the mechanism of release of the cardan axle.

8. The method according to claim 7, wherein the step (c4) further comprises sending electrical to solenoid valves to release pneumatic air from a wheel end release mechanism.

9. The method according to claim 7, wherein the step (d) further comprises after waiting for the predetermined time period, sending electrical signals to solenoid valves to release pneumatic air from a locking system for the rear axle.

10. The method according to claim 7, wherein the predetermined period of time is at least 15 seconds but no more than 45 seconds.

* * * * *